_United States Patent Office_

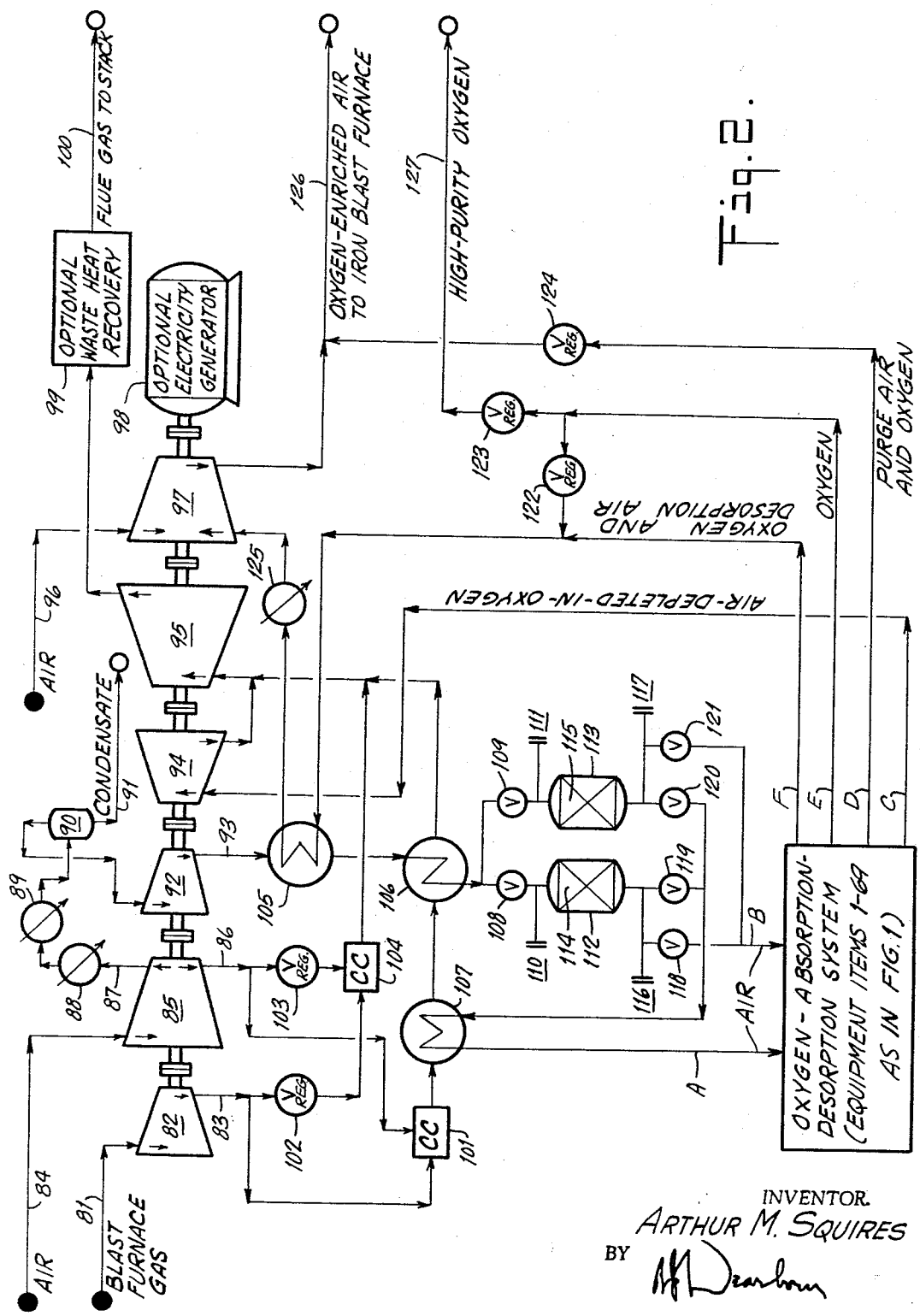
Fig. 2.
INVENTOR.
ARTHUR M. SQUIRES
BY 
ATTORNEY

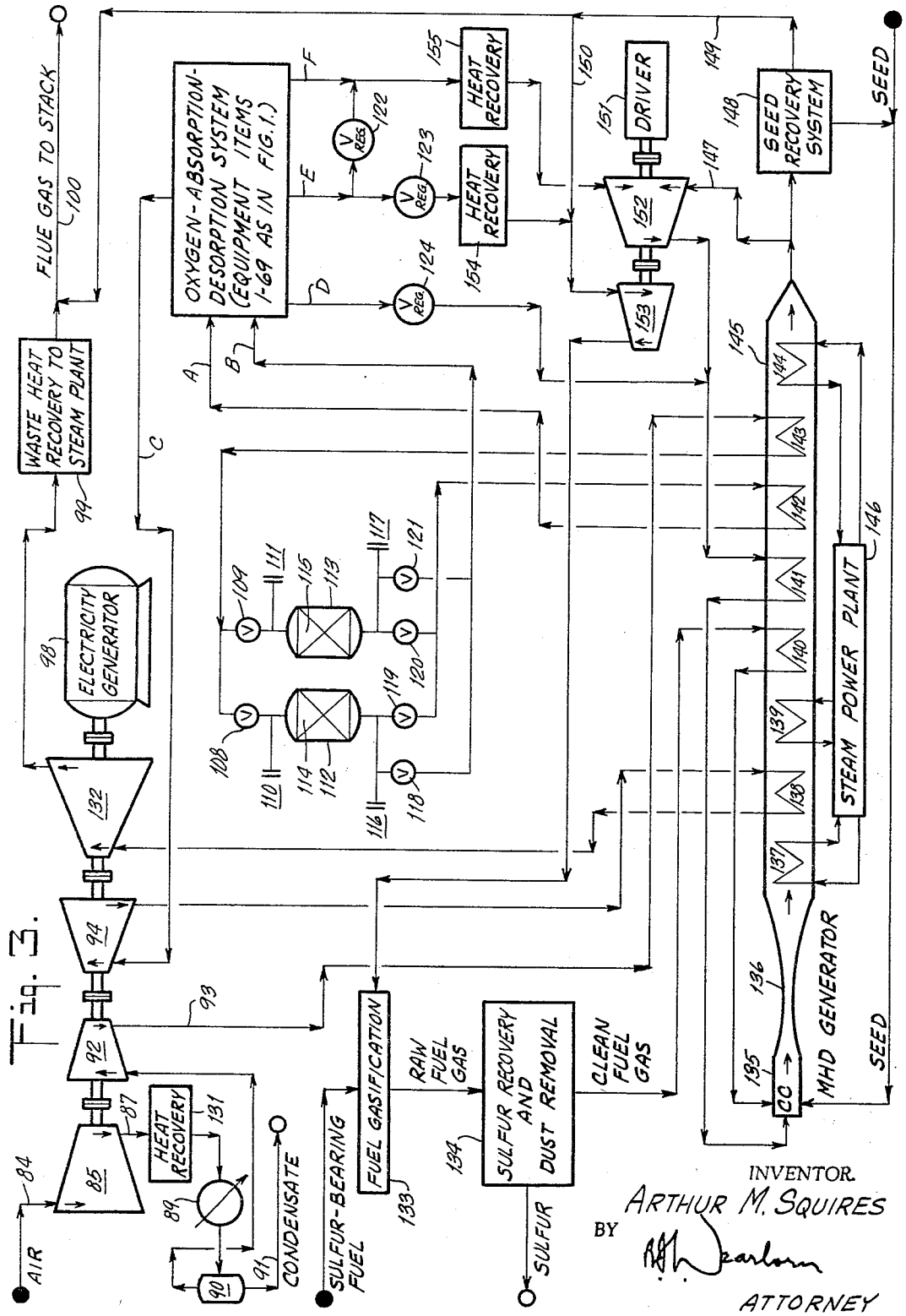

3,324,654
Patented June 13, 1967

3,324,654
METHOD AND APPARATUS FOR PRODUCING OXYGEN AND POWER
Arthur M. Squires, 245 W. 104th St.,
New York, N.Y. 10025
Filed Sept. 29, 1966, Ser. No. 582,883
23 Claims. (Cl. 60—39.02)

ABSTRACT OF THE DISCLOSURE

There is provided an improved process of the Brin type which is peculiarly useful for the simultaneous production of oxygen and power. A static bed of a solid comprising tiny intermingled crystallites of barium and magnesium oxides is employed to absorb oxygen from heated, compressed aid. Air-depleted-in-oxygen leaving the solid is expanded in a turbine. The solid is heated by the exothermic absorption reaction, and after a major part of the solid reaches a temperature at which no more oxygen can be taken up, the air is withdrawn. Oxygen is then allowed to desorb from the solid at a lower pressure, thereby cooling the solid. Toward the end of the desorption step, air is introduced to promote the desorption of oxygen at sub-atmospheric partial pressures, and air is momentarily supplied at a rate sufficient to fluidize the bed thereby at least partially mixing the solid. Examples are discussed in which the process is used (1) to supply oxygen-enriched air to a blast furnace and high-purity oxygen to steelmaking, (2) in conjunction with power production in a plant incorporating a magnetohydrodynamic electricity generator, and (3) in conjunction with the production of synthetic ammonia.

Background of the invention

This application is a continuation-in-part of my applications Ser. No. 337,900, filed Jan. 15, 1964, now U.S. Patent 3,276,203 (October 1966), and Ser. No. 561,493, filed June 29, 1966, allowed on Jan. 4, 1967. This allowed application will be abandoned in favor of the instant application as soon as the latter is allowed.

Description of the invention

This invention relates to the production of oxygen and power simultaneously, and more particularly to an improved method for producing oxygen by absorption of oxygen from air by a solid at high temperature, with recovery of oxygen by its subsequent desorption from the solid.

An object of this invention is to provide an improved economic method for recovering oxygen from atmospheric air.

Another object of the invention is to provide a method of unusually great economy for recovering oxygen from atmospheric air while simultaneous producing power.

Another object of the invention is to supply compressed oxygen-enriched air.

Another object of the invention is to supply compressed oxygen-enriched air to a blast furnace while also supplying high-purity oxygen for use in a steelmaking furnace.

Another object of the invention is to supply oxygen for use in an advanced power cycle in which the temperature of cycle fluids is raised by direct addition of products of combustion of a fuel with oxygen or oxygen-enriched air.

Another object of the invention is to provide an oxygen-absorption-desorption solid of particular value for use in the new process of the invention.

Another object of the invention is to provide a vessel to house a bed of oxygen-absorption-desorption solid which has particular merit in the new process.

The first commercial production of oxygen, from 1881 onward for more than 20 years, was accomplished by processes developed by the Brin brothers of France for the absorption of oxygen from air by barium oxide, causing barium peroxide to form, the oxygen being recovered by removing air and causing the barium peroxide to decompose. The first Brin plants [Mémoires Société des ingénieurs civils de France, 1881, vol. 1, pp. 450–456; British Patents 1416 (1880), 151 (1885), and 157 (1885)] absorbed oxygen from air supplied at a pressure somewhat above atmospheric and at substantially atmospheric temperature to horizontal metal tubes filled with pieces of BaO and situated within a furnace. The tubes were held at about 930° to 1100° F. while oxygen was absorbed. When the solid could take up no more oxygen, the furnace firing-rate was increased, and the tubes were heated to about 1470° F. Oxygen was desorbed at this temperature and at a sub-atmospheric pressure. A complete cycle took about three to four hours.

Later Brin plants [U.S. Patent 432,815 (1890); Engineering News, vol. 23 (January–June 1890), pp. 341–343; Engineering & Mining Journal, vol. 67 (1899), pp. 83–84] used vertical seven-inch metal tubes filled with BaO and housed in a furnace, the firing of which was governed so that the tubes were held at a substantially constant temperature through both oxygen-absorption and oxygen-desorption operations. The temperature was between about 1290° and 1380° F.—authorities differ as to the exact temperature, but agree that it was held constant. Oxygen was absorbed from air supplied at substantially atmospheric temperature and at 25 to 30 pounds per square inch absolute (p.s.i.a.). Oxygen was desorbed at about 1 p.s.i.a., the oxygen being withdrawn by the same compressor as that which supplied the air, now working as a vacuum pump. An advantage of the later Brin plants was that a cycle took only about ten minutes, there being no loss of the time formerly taken to raise and lower the tube temperature.

The Brin plants could not hold their own in competition with the low-temperature air-rectification plants introduced early in this century. The abandonment of the Brin process was generally interpreted to mean that a high-temperature absorption-desorption process cannot provide oxygen at the economy afforded by low-temperature plant. This opinion is generally held to the present day, not having been dispelled by an extensive patent literature proposing novel absorption-desorption processes, including a number of processes which used fluidized beds and transfers of solid between continuously-operated absorption and desorption zones. The fact that these proposals for continuous processes have failed to lead to operations in competition with modern low-temperature plant is discouraging to a new effort to establish an intermittent process of the Brin type.

I have therefore been greatly surprised to discover that an improved process of the Brin type can supply oxygen —under certain circumstances which are often met with— at an energy input chargeable to the oxygen product which is markedly below that required by even the most modern low-temperature plant. Where there is a need for oxygen there is commonly also a need for power. Wherever both needs exist, the present invention may be used with great advantage.

According to the invention there is provided an improved process of the Brin type useful in the production of oxygen or power comprising: supplying a bed of a solid capable of absorbing oxygen exothermically; compressing air to an elevated pressure, such as 60 p.s.i.a. or greater, and adding heat to the compressed air; conducting an oxygen-absorption step by passing the heated air into the bed thereby progressively raising the temperature of at least part of the bed; withdrawing air-depleted-inoxygen and expanding the air-depleted-in-oxygen through a power-developing expansion turbine; terminating the oxygen-absorption step by interrupting the flow of air to the bed; conducting an oxygen-desorption step while supplying substantially no heat to the bed by indirect exchange of heat from hot combustion gases by reducing the pressure in the bed thereby causing oxygen to desorb therefrom endothermically thereby lowering the temperature of at least part of the bed; conducting the oxygen-absorption step and the oxygen-desorption step repeatedly in the bed; and mixing the solid in the bed periodically thereby displacing solid from the air-inlet end of the bed into the interior of the bed.

If the requirement for oxygen is relatively small and the requirement for power is relatively large, power may be supplied continuously from a gas-turbine plant operating continuously, while oxygen may be advantageously produced intermittently from a single bed of the oxygen-absorption-desorption solid. This bed would receive only a small portion of the total flow of compressed air, and the operation of the power turbine of the gas-turbine plant would not be greatly affected by the relatively small changes in flow to the turbine which occur when the bed is shifted back and fourth between oxygen-absorption and oxygen-desorption service. The heated air may be advantageously bypassed around the oxygen-adsorption-desorption bed during an oxygen-desorption step.

If there exists a relatively large requirement for oxygen, the flow of air-depleted-in-oxygen from an oxygen-absorption step may constitute a major part of the flow to the power turbine. The process may then advantageously be practiced simultaneously in more than one bed, with the operating cycles of the several beds staggered so that at least one bed is absorbing oxygen from air at nearly all times. In this way, the flow of air-depleted-in-oxygen to the power turbine is maintained substantially continuous, except possibly for brief intervals when air is by-passed around the oxygen-absorption-desorption beds during a changeover from one phase of the operating cycle to the next.

Unlike the practice in either version of the Brin brothers' plants, air is heated prior to its introduction to the oxygen-absorption solid. If air is heated to a suitable degree, the bed of oxygen-absorption-desorption solid may be operated in a substantially adiabatic manner—i.e., with substantially no heat additions or withdrawals other than by flow of gases to and from the bed. The bed need not be placed in a metal tube of relatively small diameter, housed in a furnace, but may advantageously be placed in a well-insulated vessel many feet in diameter. The temperature of the bed is not held constant—nor increased by supplying heat during an oxygen-desorption step, as in the first Brin plants—but is allowed freely to increase during oxygen absorption and to decrease during oxygen desorption. The benefits of adiabatic operation cannot be attained if air is introduced into the bed at substantially atmospheric temperature, as was done in the Brin plants, for sufficient heat must be added to the bed in the air to match the heat in the gaseous products from the bed. The average temperatures of oxygen and air-depleted-in-oxygen are substantially determined by the nature of the solid absorbent and the operating pressure levels during absorption and desorption.

It is advantageous to increase the air pressure in the new process of the invention from the 25 to 30 p.s.i.a. level used in the Brin plants to at least about 60 p.s.i.a., so that power may be recovered with good efficiency in the step of expanding air-depleted-in-oxygen in a turbine. If a still higher air pressure is used, between around 200 and 600 p.s.i.a., say, the air-depleted-in-oxygen may be advantageously subjected to a reheat step at an intermediate pressure in the expansion step. Heat may also be added to the air-depleted-in-oxygen prior to its expansion, if desired. An addition of heat may be either by indirect exchange of heat from hotter gases or by direct addition of hotter gases. Only heat additions by indirect heat exchange should be made if air-depleted-in-oxygen is desired as a second product from the plant. Air-depleted-in-oxygen is an attractive starting material for a process to make an "inert," oxygen-free gas.

During an oxygen-absorption step, the oxygen-adsorption-desorption solid is heated in a wave starting at the air-inlet end and moving toward the outlet. At the beginning of the step, the solid ideally is at a uniform temperature which is the lowest temperature attained by the solid during a complete absorption-desorption cycle. The solid has been cooled to this temperature during a preceding oxygen-desorption step. Throughout at least most of the oxygen-absorption step in a given bed, air-depleted-in-oxygen leaves the bed at substantially this lowest temperature. The temperature progressively reached by the solid as the oxygen-adsorption step unfolds is that temperature at which the solid can absorb substantially no more oxygen from air at the prevailing air pressure. The oxygen-absorption-desorption solid should preferably contain an active oxygen-adsorption-desorption ingredient in considerable excess of the amount which must react to provide the heat needed to carry the solid up to this temperature limit.

A problem arises in connection with the substantially adiabatic operation of an oxygen-adsorption-desorption bed through a number of cycles. The problem is concerned with the fact that the distribution of heat in the oxygen-absorption-desorption solid at the end of an oxygen-absorption step is not congruent with the distribution of the oxygen which was absorbed during the step.

The average temperature at which air must be supplied in order that the bed's overall operation be substantially adiabatic is in general far below the temperature limit reached by the solid during an oxygen-absorption step. Accordingly, throughout this step heat must be supplied to air entering the bed to raise its temperature to the solid-temperature limit. This heat arises from the exothermic oxygen-absorption reaction. Therefore, at the end of the step the solid near the inlet of the bed contains oxygen whose absorption heat was carried away by the air. No heat is locally available in the solid to desorb this "excess" oxygen in a succeeding desorption step, and unless measures are taken, as hereinafter explained, excess absorbed oxygen will accumulate during a series of absorption-desorption cycles.

The heat of absorption of the excess oxygen is returned to solid as air-depleted-in-oxygen is cooled by solid just ahead of the temperature wave which moves through the bed. At the end of the oxygen-absorption step, most of the bed contains more heat than can be used up to desorb the oxygen which was locally absorbed during the step. Unless measures are taken, the temperature in the bulk of the bed at the end of the oxygen-desorption step will gradually rise during a series of cycles.

This "excess" heat might be carried to the "excess" oxygen by providing means which distribute heat from the air-outlet end to the air-inlet end of the bed toward the latter part of an oxygen-desorption step. Internal heat-exchange tubes containing a refluxing heat-exchange medium are a possible means. Another is to cause additional oxygen to flow into and through the bed from air-outlet end to the air-inlet end at a rate considerably greater than the rate at which oxygen is being desorbed.

It is preferable to carry the "excess" oxygen to the heat. A preferred means of distributing the "excess" oxygen from the air-inlet end into the bulk of the solid bed is to gently fluidize the solid with air for a few moments late in the oxygen-desorption step. Alternately, air-depleted-in-oxygen or oxygen may be used as fluidizing gas in this operation, and the fluidization may be shifted to another point of time within the absorption-desorption cycle. The momentary fluidization of the solid serves to mix the solid, transferring solid from the air-inlet end into the bulk of the bed, and placing "new" solid at the air-inlet end.

It is advantageous at the outset of operations to supply an oxygen-absorption-desorption solid which already contains some absorbed oxygen. When operations are initiated with such a solid, absorbed oxygen is present in the interior of the bed to use up the "excess" heat which the solid acquires during the first oxygen-absorption step. During subsequent operations, the momentary fluidized mixing serves to maintain a suitable average level of absorbed oxygen in the interior of the bed, so that no solid ever loses all of its absorbed oxygen at the conclusion of an oxygen-desorption step.

It is not required that the contents of the bed be thoroughly mixed each time the solid is fluidized. It is sufficient that the mixing be adequate to turn over the contents of the bed during the course of a number of cycles. The adequacy of the mixing may be judged from the temperature to which the bed returns at the end of each oxygen-desorption step. [For a given step, this temperature may be judged by noting the air-depleted-in-oxygen temperature which prevails during most of the succeeding oxygen-absorption step.] An upward trend in this temperature is a sign that mixing has not been adequate. If the absorbed oxygen in the bulk of the solid should fall to too low a level—so that some of the solid lacks absorbed oxygen altogether at the end of the oxygen-desorption step—an accumulation of "excess' heat will occur, which will be reflected by the upward trend in bed temperature.

An oxygen-absorption step is terminated when the temperature of air-depleted-in-oxygen rises by a predetermined amount, preferably a minor fraction of the temperature rise in the bulk of the solid during the step.

At the conclusion of an oxygen-absorption step, air must be purged from the bed before oxygen can be desorbed. If high-purity oxygen is the only product required from the process, the purge air together with a first portion of desorbed oxygen may advantageously be discarded. If oxygen-enriched air is required as at least one product, the purge air may advantageously be blended with this product.

The quantity of oxygen absorbed and desorbed from a bed during a given cycle may be increased by extending the desorption of oxygen to sub-atmospheric pressures. If high-purity oxygen is the only product required, the desorption of oxygen at sub-atmospheric pressures may advantageously be promoted by use of a vacuum blower. If oxygen-enriched air is required as at least one product, the desorption of oxygen at sub-atmospheric pressures is advantageously promoted by supplying "desorption" air, preferably at a progressively increasing rate, so that the bed yields a gas at substantially atmospheric pressure at a substantially steady rate which contains oxygen at a progressively lower sub-atmospheric partial pressure. This gas may advantageously be blended with the oxygen-enriched-air product.

At the time of the filing of my aforementioned patent application, Ser. No. 337,990, I preferred to use manganic oxide as the active ingredient of the oxygen-absorption-desorption solid. I now prefer barium oxide. Its reaction with oxygen, as well as the subsequent decomposition of the reaction product, occurs at a much faster rate, and it is less subject to loss of reactivity through the action of unwanted side reactions. I believe strontium oxide to react reversibly with oxygen at a good reaction rate at temperatures above about 750° F. Strontium oxide would have the advantage over barium oxide that operating temperature levels are lower, but I prefer barium oxide because it permits operation at much lower pressure levels.

An extensive patent literature discloses many other solids capable of absorbing and desorbing oxygen as pressure and temperature are varied, and describes their merits. Much effort has been expended to find a solid giving satisfatcory performance at lower temperatures, including not-too-successful attempts to find an organic reagent which could work at essentially atmospheric temperature. I do not wish my invention to be limited to the use of BaO, but I do not regard a solid which permits operation at a lower temperature to be much of a bargain, in the context of my new process, if its reaction with oxygen is not substantially reversible, if the absorption-desorption reactions do not proceed at a good rate, and if its activity is not maintained over many operating cycles.

Barium oxide should be supplied to my new process in a porous, reactive form. For example, $BaCO_3$ may be pelletized with an active carbon and conducted in an oxygen-free atmosphere through an indirectly-heated tunnel kiln, in which BaO is formed by the reaction: $BaCO_3+C=BaO+2CO$. The temperature of the material must be kept below the BaO—$BaCO_3$ eutectic temperature—between about 1885° and 1940° F.

I prefer not to use a solid consisting simply of BaO. Only a small fraction of such a solid could be converted to $BaO_2$ in a given oxygen-absorption step according to my new process, and there is an advantage in supplying a solid comprising a mixture of BaO and a second solid ingredient which is chemically inert toward $O_2$, BaO, and $BaO_2$ in the operating temperature range. It is desirable that the second ingredient have higher heat-storage capability per unit volume than BaO has. I prefer to use magnesium oxide as the second ingredient. Not only does MgO have good heat-storage capability, but also a solid prepared by calcining $MgCO_3$ forms a good structure within which to incorporate the BaO. Such a solid takes on good mechanical strength when heated to a temperature in the neighborhood of 1800° F., forming a rugged porous structure which may be penetrated by gases thereby permitting the gases to react with a second solid incorporated within the structure.

A preferred solid for the practice of the present invention is a solid comprising an intimate intermingling of tiny crystallites of BaO and MgO, preferably having a Ba/Mg atomic ratio not greater than unity. The solid may be prepared as follows: Pelletize co-precipitated $BaCO_3$ and $MgCO_3$ with an active carbon, such as carbon black, together with a little starch paste. The total carbon content of the pellets is preferably about 6 to 8 pounds per 100 pounds of $BaCO_3$. The pellets should be dried and heated, first to about 1200° to 1300° F. to decompose $MgCO_3$, and then to about 1750° to 1800° F. to bring about the aforementioned reaction between $BaCO_3$ and C. During the $MgCO_3$-decomposition step, the solid should be protected from oxygen and moisture. Care should be taken during this step to prevent reaction between $CO_2$ and the active carbon, and the solid may advantageously be exposed to gases containing sufficient carbon monoxide to inhibit the $CO_2$—C reaction. This expedient will permit use of a higher temperature affording more rapid decomposition of $MgCO_3$. During the $BaCO_3$-decomposition step, the solid should be protected from oxygen, moisture, and carbon dioxide. After the $BaCO_3$-decomposition step, any excess carbon remaining may advantageously be burned away by exposing the still hot solid to a stream containing oxygen at a suitably low concentration level, so that $CO_2$ cannot build to a pressure exceeding the equilibrium decomposition pressure of $BaCO_3$ at the temperature of the solid.

During oxygen-absorption-desorption operations with this solid, the $CO_2$ content of air must be reduced to a level below that which would cause $BaCO_3$ to form at the lowest temperature level reached by the solid bed during a cycle. A preferred method of removing carbon dioxide from air to be treated by my new process is to contact the air with a bed of calcined dolomite at a temperature above about 600° F. The Ca/Mg atomic ratio of the dolomite used should preferably not exceed about 1.1. The temperature at which air is treated with calcined dolomite should be such that the equilibrium decomposition pressure of $CaCO_3$ at this temperature is below the equilibrium decomposition pressure of $BaCO_3$ at the lowest temperature level reached by the oxygen-absorption-desorption solid during normal operations.

Air often contains appreciable amounts of CO, hydrocarbons, and organic vapors. These materials, if present, should be removed by combustion during the calcined-dolomite contacting step. Many natural dolomites will be found to contain iron in sufficient amounts to promote the necessary combustion. If necessary, a contact agent such as for example an iron oxide or a nickel oxide should be added to the calcined-dolomite bed.

The air should be freed of moisture to the extent necessary to prevent formation of $Ca(OH)_2$ when air is treated with calcined dolomite, or to prevent formation of $Ba(OH)_2$ at the lowest temperature level reached by the solid.

A disadvantage of BaO in the process is that the block valves needed to direct the flows of the various gases to and from an oxygen-absorption-desorption bed must handle gases at high temperatures. Critical parts of the valves, such as the seats, may be cooled, mitigating the problem of maintaining their good performance through a great many cycles. The problem is most serious for valves which handle substantially pure oxygen, and it is advantageous to cool the oxygen within the vessel housing the oxygen-absorption-desorption bed. The cooling can advantageously be accomplished by exchanging heat from the oxygen from a given oxygen-desorption step to a portion of the air used in a succeeding oxygen-absorption step. This portion of the air may conveniently be supplied at the temperature of the calcined-dolomite contacting step. The heat may conveniently travel from oxygen to air via a heat-storage solid placed in an extension of the vessel housing the oxygen-absorption-desorption bed.

The process of this invention affords particularly good economy in providing oxygen-enriched air to an iron-making blast furnace at substantially the pressure required at the furnace. A compressor delivering oxygen-enriched air at this pressure can advantageously be driven by gas turbines expanding air-depleted-in-oxygen and flue gases derived from the combustion of blast furnace fuel gas, the flue gases being expanded after they have given up heat by heat-exchange to air from which oxygen is absorbed. A plant providing oxygen-enriched air in this manner can also advantageously be arranged to supply a quantity of high-purity oxygen sufficient to convert hot metal from the blast furnace to steel by one of several known steelmaking processes.

The process of this invention can advantageously work in cooperation with a magnetohydrodynamic (MHD) electricity generator which handles combustion gases produced with use of desorbed oxygen. A report prepared by Westinghouse Electric Corporation for the Office of Coal Research (R. & D. Report 13, Contract 14–01–0001–476, covering Feb. 4, 1965, to Feb. 3, 1966, available from O.C.R. and on deposit at many libraries) describes a design of a power plant incorporating an MHD generator and burning coal. The design presented serious problems concerned with the heating of combustion air, with the recovery of seed material—a cesium salt added to combustion gases to render the gases electrically conducting—and with the removal of nitrogen oxides and sulfur oxides from stack gases to meet air-pollution standards. The nitrogen-and-sulfur-oxide-recovery plant which had to be provided consumed about 15 percent of the total electricity generated, and produced nitric acid in large amounts. An 800-megawatt plant produced about 800 tons of $HNO_3$ per day, reckoned at 100% purity, against a national use rate of 18,000 tons per day. The yield of nitric acid is so large that the utilization of plants based upon the Westinghouse design must surely be sharply limited by lack of a market for the acid.

The Westinghouse report advanced but did not develop the idea that if high-purity oxygen were used in the combustion, instead of air, then no nitrogen oxide recovery system would be required, recovery of seed would be easier, and the problem of heating combustion air to a sufficiently high temperature would be eliminated. Flue gas would need to be recycled to the combustion in order to limit the temperature in the MHD generator to a practicable level.

This broad idea is not at all attractive if the oxygen must be provided from conventional low-temperature plant. The idea is transformed into a preferred way to incorporate an MHD electricity generator into a power station if oxygen is provided from my new process.

One is left with the problem of dealing with sulfur oxides and fly ash. The time is rapidly approaching when our electricity-generating stations will no longer be able to use the atmosphere freely as a dumping ground for these wastes. The removal of sulfur oxides from stack gases is an expensive proposition, and a better idea would be to supply to the MHD combustion a clean fuel gas prepared by gasifying the coal (or other sulfur-bearing fuel) with oxygen provided from my new process. Raw fuel gas would be treated for removal of sulfur and dust, and elemental sulfur would be recovered for sale, producing a revenue covering a significant part of the gasification costs.

The invention may be used with great advantage in connection with the synthesis of ammonia. Fuels may be converted by their partial combustion with oxygen-enriched air, supplied by the new process of the invention, to a gas consisting primarily of $H_2$, CO, and $N_2$. This gas may be converted by known means to $NH_3$. The plant required for this conversion consumes a great deal of power—for compression of $H_2/N_2$ synthesis gas, for recycling gas through the synthesis reactor, and for refrigeration to recover $NH_3$ product.

Other examples of the advantageous use of the invention to supply both oxygen and power could be given, but the foregoing examples are sufficient for purposes of illustration.

Description of the drawings

The invention including various novel features will be more fully understood by reference to the accompanying drawings and the following description of the several alternatives illustrated therein.

FIGURE 2 illustrates diagrammatically an embodiment of the invention suitable to supply oxygen-enriched air to an iron blast furnace and also a stream of oxygen at high purity.

FIGURE 3 illustrates diagrammatically how the absorption-desorption apparatus of FIGURE 1 can act together with an advanced power cycle which incorporates a magnetohydrodynamic electricity generator and which offers the advantage that effluents from the cycle are free from objection from standpoint of air pollution.

Description of preferred embodiments

Figure 1:
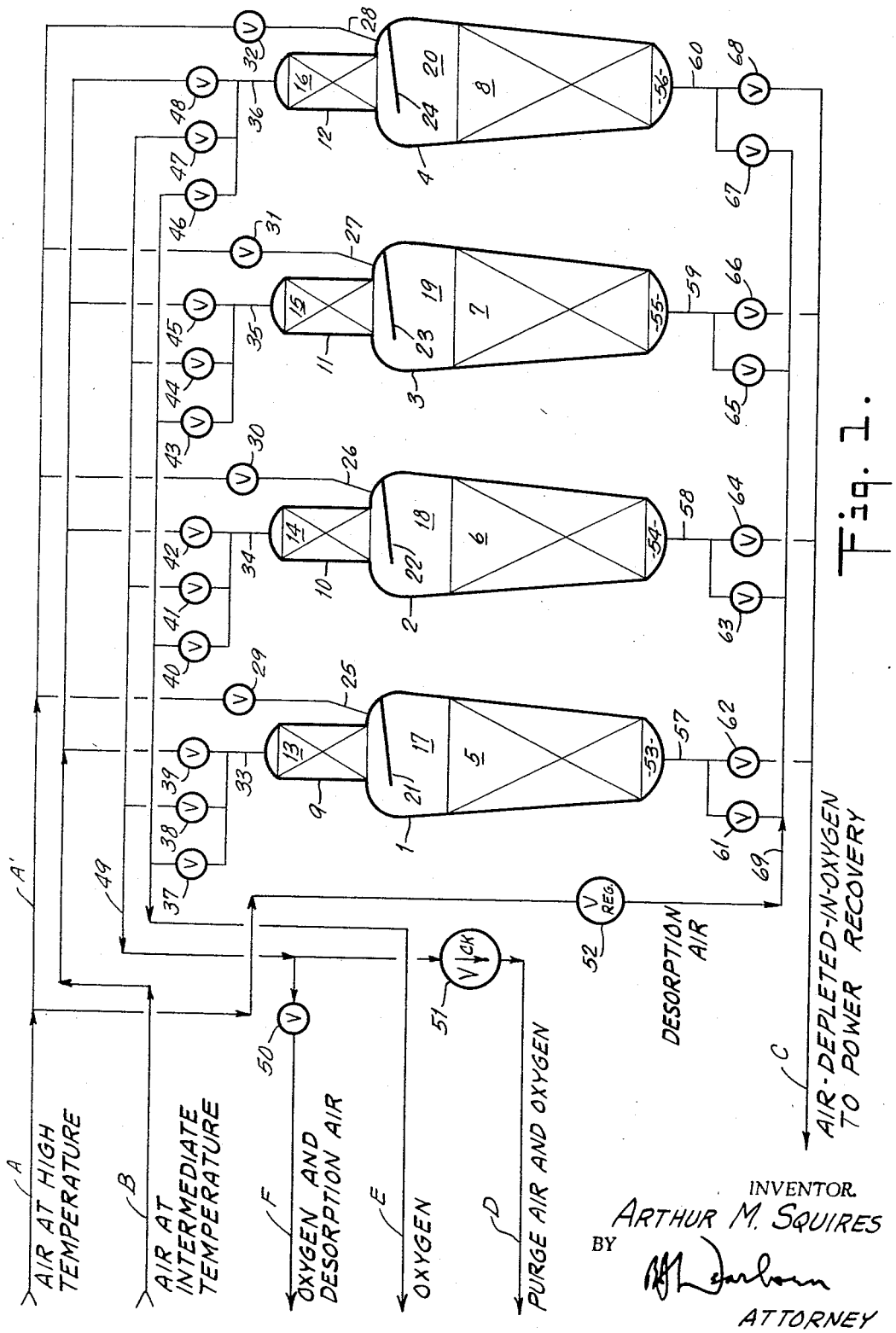
FIGURE 1 illustrates diagrammatically apparatus suitable for carrying out the absorption and desorption of oxgygen according to the invention.

FIGURE 1 illustrates an oxygen-absorption-desorption system according to the invention. The major parts of oxygen-absorption-desorption vessels 1, 2, 3, and 4 are substantially filled with beds 5, 6, 7, and 8 respectively of a solid having a mean particle size of about one-eighth inch, say, and preferably displaying at least a five-fold range of particle diameter. Beds 5–8 are normally static. The solid comprises tiny intermingled crystallites of BaO and MgO at a Ba/Mg atomic ratio of 30/70, say. Vessels 1–4 are fitted with upper extended portions 9–12 respectively, substantially filled with beds 13–16 respectively of a heat-storage solid, which may for example comprise tabular alumina pellets of about one-quarter-inch diameter, say. Plenum spaces 17–20 lie between beds 13–16 respectively and active-solid beds 5–8 respectively below. Plenum spaces 17–20 communicate with header A' via lines 25–28 respectively and valves 29–32 respectively. The upper ends of beds 13–16 communicate via lines 33–36 respectively with header B via valves 39, 42, 45, and 48 respectively; with header 49 via valves 38, 41, 44, and 47 respectively; and with header E via valves 37, 40, 43, and 46 respectively. Plenum spaces 53–56 lie below beds 5–8 respectively, and communicate via lines 57–60 respectively with header C via valves 62, 64, 66, and 68; and with header 69 via valves 61, 63, 65, and 67 respectively.

Vessels 1 through 4 operate cyclically, each vessel playing each of four major roles in turn—an oxygen-absorption phase and three oxygen-desorption phases. I will first describe in turn each phase of the complete cycle in vessel 1, including minor operating steps of short duration which occur between certain of the major phases. Then I will indicate the sequence of phases as they run off simultaneously in the four vessels.

I will begin the description of the operating phases in vessel 1 with the phase in which bed 5 serves to absorb oxygen from air. Air enters the oxygen-absorption-desorption system via lines A and B. The $CO_2$ and $H_2O$ in the air are preferably below levels which would cause $BaCO_3$ and $Ba(OH)_2$ respectively to form in bed 5. About 75.7 percent, say, of the total air enters via line A at a pressure of 461 p.s.i.a., say, and at a temperature of 1530° F., say. The temperature of air in line A is controlled to maintain the overall system of FIGURE 1 in thermal balance; no heat is supplied to the system at a temperature higher than the temperature of air in line A. Most of the air from line A—on a time-average basis, about 74.05 percent, say, of the total air—enters header A', and flows from header A' through open valve 29, line 25, and past the upper side of baffle 21 into plenum space 17. About 24.3 percent, say, of the total air enters via line B at 465 p.s.i.a., say, and at 800° F., say. Air from line B flows through open valve 39 and line 33 into bed 13 of heat-storage solid, which transfers heat to this air. Air from bed 13 mixes with air from line 25 flowing past the upper side of baffle 21, and the combined air flows from plenum space 17 into and through bed 5, where oxygen is absorbed from the air. [Plenum spaces 18–20 contain baffles 22–24 respectively, similar to baffle 21 in space 17.] Air-depleted-in-oxygen flows from bed 5 through plenum space 53, line 57, and open valve 62 into line C, which conducts the air-depleted-in-oxygen to power-recovery means (not shown in FIGURE 1). Valves 37, 38, and 61 are closed.

At the beginning of the above-described absorption phase of the cycle of operation in vessel 1, most of the active solid in bed 5 is substantially at 1500° F., say. Absorbent solid in bed 5 is heated during the present phase of the cycle, reaching a temperature at which no more oxygen can be absorbed by the solid at the prevailing partial pressure of oxygen. The temperature varies a little on account of pressure drop in the flowing air, and averages about 1810° F., say. Absorbent in bed 5 is heated in a wave starting at the inlet end of the absorbent bed and moving toward the outlet. For best results, the height of bed 5 is chosen so that bed 5 is tall by comparison with the height of solid actually undergoing reaction at a given moment. The relatively shallow layer of reacting solid may be termed a reaction "front" which moves downward as the present phase of the cycle unfolds. At a given moment, solid ahead of the reaction front—i.e., below it—is still substantially at the initial temperature. During most of the phase, air-depleted-in-oxygen leaves the bed at about 1500° F., say, and at 441 p.s.i.a., say. The phase is terminated when the front "arrives" at the bottom of the bed—i.e., when the temperature of air-depleted-in-oxygen entering plenum 53 rises by a pre-assigned amount.

The oxygen-absorption phase in vessel 1 is terminated by closing valves 29, 39, and 62. There follows an operating step of short duration in which the pressure in vessel 1 is reduced by allowing air-depleted-in-oxygen to flow from vessel 1 into vessel 3 via header 69; in this step, valves 61 and 65 are open, and valve 52 is closed. After the pressures in the two vessels become substantially equal, valve 61 is closed, and valve 38 is opened, initiating a first oxygen-desorption phase in vessel 1. Purge air and then oxygen flows from bed 5 through plenum 17 into bed 13 of heat-storage solid, which takes up heat from the air and oxygen thereby lowering their temperature. The gases flow from bed 13 through line 33, open valve 38, and header 49 into line D, which delivers oxygen to a point of oxygen usage (not shown in FIGURE 1) which is maintained at an appreciably superatmospheric pressure. Valve 50 is closed. The rate of flow in line D is controlled by means not shown in FIGURE 1.

An oxygen-desorption proceeds, the pressure in line D falls, reflecting a drop in temperature in the solid in bed 5 and a corresponding decline in the equilibrium decomposition pressure of $BaO_2$. When the pressure in line D falls to a pre-assigned level—preferably just a little above the pressure at the aforementioned point of oxygen usage—the first oxygen-desorption phase in vessel 1 is terminated by closing valve 38. Valve 37 is opened, initiating a second oxygen-desorption phase in vessel 1. High-purity oxygen flows from bed 5 through open valve 37 into line E, which conducts the oxygen from the system at a rate controlled by means not shown in FIGURE 1. The oxygen is cooled by bed 13.

The second oxygen-desorption phase is terminated when the pressure in line E falls to a pressure preferably just a little above atmospheric. Valve 37 is closed, and a third oxygen-desorption phase is initiated by opening valves 50, 38, and 61. Check valve 51 closes automatically, preventing backflow of gas from the aforementioned point of oxygen usage. Desorption air is supplied to bed 5 from line A via flow-regulating valve 52, header 69, open valve 61, line 57, and plenum 53. This air amounts to about 1.45 percent, say, of the total air on a time-average basis. The desorption air causes oxygen to desorb from bed 5 at sub-atmospheric pressures. The air together with desorbed oxygen passes from bed 5 through open valve 38 and header 49 into line F, which conducts the air and oxygen from the system at a pressure a little above atmospheric. The gases are cooled by bed 13. Flow-regulating valve 52 is the control on the rate of desorption of oxygen from bed 5 during this third oxygen-desorption phase.

Toward the latter moments of the third oxygen-desorption phase, an operating step of short duration is included in which an increased amount of desorption air is supplied to vessel 1, by opening valve 52, to cause bed 5 to become fluidized by the flow of air and desorbing oxygen. This step is initiated when the partial pressure of oxygen in gases from bed 5 falls to a pre-assigned level—about 0.7 atmosphere, say. The purpose of the step is to mix the solid in bed 5, at least partially, thereby tending to cause solid comprising the top surface of the bed to be shifted into the interior. It is preferable that each of vessels 1 through 4 to be constructed to house each of beds 5 through 8 respectively in a frusto-conical chamber with a gradual taper and the smaller end at the bottom. Gas leaving bed 5 while it is fluidized may be dusty, and it is desirable to vent at least a portion of this gas from time to time directly to the atmosphere, through a connection from plenum 17 to the atmosphere not shown, in order to prevent the accumulation of dust in vessel 1.

The fluidization step is terminated when the partial pressure of oxygen in gases from bed 5 has fallen to 0.65 atmosphere, say—the solid is then substantially at 1500° F., say. Valves 50, 52, and 38 are closed There follows an operating step of short duration in which the pressure in vessel 1 is increased by allowing air-depletedin-oxygen to flow from vessel 3 into vessel 1 via header 69; in this step, valves 61 and 65 are open. [If desired, the fluidization of vessel 1 may be prolonged by allowing air-depleted-in-oxygen to flow into vessel 1 at a fluidizing rate during at least a part of the pressure-equalization step.] After the pressures in the two vessels become substantially equal, valve 61 is closed, and valve 29 is opened to raise the pressure in vessel 1 to that of line A. Valves 39 and 62 are opened, placing vessel 1 again in the service of absorbing oxygen from air.

It is preferable that the second and third oxygen-desorption phases be long in duration relative to the first.

This completes the description of the cycle of operating phases in vessel 1.

The overall cycle in a given absorption-desorption vessel may be viewed as comprising seven steps, which for convenience may be designated by symbols as follows:

Operating step
Symbol:
- Abs_____ Oxygen-absorption phase
- Eq−_____ Pressure equalization with reduction in pressure
- P+O____ First oxygen-desorption phase, discharging purge air and oxygen
- O_____ Second oxygen-desorption phase, discharging oxygen
- O+A____ Major part of third oxygen-desorption phase, discharging desorption air and oxygen
- Flui_____ Fluidization
- Eq+_____ Pressure equalization with increase in pressure The following tabulation sets forth the respective roles played by the four absorption-desorption vessels during succeeding phases of operation of the overall absorption-desorption system:

| | Vessel 1 | Vessel 2 | Vessel 3 | Vessel 4 |
|---|---|---|---|---|
| Phase I | Abs | O | P+O | Abs |
| Phase II | Abs | O+A | O | Abs |
| Phase III | Abs | Flui | O | Abs |
| Phase IV | Abs | Eq+ | O | Eq− |
| Phase V | Abs | Abs | O | P+O |
| Phase VI | Abs | Abs | O+A | O |
| Phase VII | Abs | Abs | Flui | O |
| Phase VIII | Eq− | Abs | Eq+ | O |
| Phase IX | P+O | Abs | Abs | O |
| Phase X | O | Abs | Abs | O+A |
| Phase XI | O | Abs | Abs | Flui |
| Phase XII | O | Eq− | Abs | Eq+ |
| Phase XIII | O | P+O | Abs | Abs |
| Phase XIV | O+A | O | Abs | Abs |
| Phase XV | Flui | O | Abs | Abs |
| Phase XVI | Eq+ | O | Eq− | Abs |

The phase which follows Phase XVI is identical to Phase I.

Valve settings and flow patterns have been described in detail for the operation of vessel 1. It will not be necessary to describe in detail the valve settings and flow patterns for the operation of the remaining vessels, for they will be readily understood, the same principles being involved.

There is a heat-exchange relationship between air which enters the system of FIGURE 1 in line B and products which leave in lines D, E, and F. Purge air, oxygen, and desorption air from beds 5–8 are cooled by giving up heat to heat-storage solid in beds 13–16 respectively. Subsequently, this heat is passed on to air from line B.

The temperature at which air must be supplied in line A is determined during the operation of the system by striking a heat balance between incoming air and the products in lines C, D, E, and F. The temperatures of the products vary with time, and their time-average temperatures over a complete cycle should be frequently determined, so that the temperature of air in line A may be properly regulated.

When one initiates operation in the oxygen-absorption-desorption system of FIGURE 1, one should remember that the active solid is extraordinarily sensitive to both moisture and $CO_2$, and must be scrupulously protected from contact with untreated atmospheric air. Vessels 1–4 should be purged of air with a bone-dry, $CO_2$-free gas—nitrogen gas obtained by vaporizing liquid nitrogen, say—before the active solid is put in place. Heating of the bed should be carried out by passing a hot, bone-dry, $CO_2$-free gas through the bed. The partial pressure of oxygen in the heating gas is preferably adjusted during the heating step so that when the bed reaches the operating temperature of 1500° F., say, the BaO in the solid is already partially converted to $BaO_2$.

I now give an example of the process conducted in the apparatus of FIGURE 1. The example is reckoned for an oxygen-absorption-desorption solid comprising 30 mole percent BaO and 70 mole percent MgO, the two chemical species being present in form of tiny intermingled crystallites. I have assumed that the BaO crystallites are such that their reaction with oxygen forms $BaO_2$ displaying an equilibrium decomposition pressure in accordance with the interpretation placed upon the data of Hildebrand [Journal of the American Chemical Society, vol. 34 (1912), pp. 246–258] by Lewis and Randall [Thermodynamics, McGraw-Hill, First edition (1923), pp. 488–489]; viz., $\log P_{O_2} = (-7871/T) + 7.04$, where $P_{O_2}$=equilibrium decomposition pressure in atmospheres and $T$=absolute temperature in degress Kelvin. Some other authors who have studied the matter have reported somewhat higher values for the equilibrium decomposition pressure of $BaO_2$. Recalculation of my example with the assumption of higher equilibrium decomposition pressures would give rise to a general lowering of temperature level, if the pressure levels were held the same; or, if temperatures were held more or less the same as in the example, the pressure levels would be higher.

EXAMPLE

| | Temperature, °F. | Pressure | Time-average Flow in Pounds per Hour |
|---|---|---|---|
| Air in line A | 1,530 | 461 p.s.i.a | 194,705 |
| Air in line B | 800 | 465 p.s.i.a | 62,501 |
| Air-depleted-in-oxygen in line C | 1,500 | 441 p.s.i.a | 192,502 |
| Product in line D: | | | |
| Purge air | (¹) | Greater than 50 p.s.i.a. | 9,017 |
| Oxygen | (¹) | _____do_____ | 15,084 |
| Product in line E: Oxygen | (¹) | About 50 p.s.i.a. falling to about 15 p.s.i.a. | 26,815 |
| Product in line F: | | | |
| Oxygen | (¹) | About 15 p.s.i.a. | 10,065 |
| Desorption air | (¹) | _____do_____ | 3,732 |

¹ Average temperature of products in lines D, E, and F is 900° F.

The composition of air-depleted-in-oxygen is approximately 2.17 mole percent $O_2$, 96.62% $N_2$, and 1.22% A.

It will be appreciated that the foregoing example can be modified in several directions to meet the requirements of a given situation. The example is best suited for the production of oxygen-enriched air or for the simultaneous production of such air together with high-purity oxygen as a second product. If only high-purity oxygen is required, the use of desorption air may be limited to the fluidization step at the end of the third desorption phase, and the desorption of oxygen at sub-atmospheric pressure is preferably promoted by use of a vacuum blower. Alternatively, the desorption of oxygen may be terminated when the pressure has fallen substantially to atmospheric.

Circumstances governing the design of equipment which supplies compressed air to the system of FIGURE 1 and of equipment for recovery of power from air-depleted-in-oxygen may lead one to desire to use air at lower pressures in lines A and B. Satisfactory results can be obtained at pressures below those used in the foregoing example—for instance, an air pressure of about 60 p.s.i.a. in line A is satisfactory. At lower air pressures, there is greater incentive to extend the desorption of oxygen to increasingly sub-atmospheric pressure—thereby increasing either the use of desorption air or the dependence upon a vacuum blower.

FIGURE 2 illustrates an embodiment of the invention suitable to supply oxygen-enriched air to an iron-making blast furnace and also a high-purity oxygen product for use in steel-making. Blast-furnace fuel gas is introduced via line 81 at a pressure of 16.1 p.s.i.a., say, and is compressed in compressor 82 to 85.5 p.s.i.a., say, discharging in line 83. Air is supplied via line 84 at atmospheric pressure, 14.7 p.s.i.a., say, and is compressed in compressor 85 to 85.5 p.s.i.a., say, discharging partly via line 86 and partly via line 87. A portion of fuel gas from line 83 is burned with a portion of air from line 86 in combustion-chamber 101, depicted by a rectangle containing the letters "CC," to form flue gases which are cooled by heat exchange against high-pressure air in heat-exchangers 107 and 106. The remaining fuel gas from line 83 is burned with the remaining air from line 86 in combustion-chamber 104, the flows of the two gases to this combustion-chamber being regulated by flow-regulating valves 102 and 103 respectively. Air in line 87 is cooled by heat exchange in cooler 88 against atmospheric cooling water. If the available water is not cold enough to cool air to about 60° F., say, in cooler 88, optional cooler 89 is provided to further cool air to this temperature with use of a refrigerant. Water condensate is removed from the air in drum 90 and is discarded via line 91. Air from drum 90 is further compressed to 471 p.s.i.a., say, in compressor 92, discharging in line 93. Air in line 93 is heated, first by heat exchange against oxygen in heat-exchanger 105, and then to about 800° F., say, by heat exchanger against flue gases in heat-exchanger 106. Air is then contacted with one of the two solid-particulate beds 114 or 115 housed in vessels 112 and 113 respectively. These beds comprise granules of calcined dolomite, or the equivalent thereof, having a particle diameter on the order of one-eighth inch, say. As an example of the operation of vessels 112 and 113, suppose air is being contacted with bed 114. Valve 108 is open, while valve 109 is closed. Valve 119 is open and admits about 75.7 percent, say, of the air to line A. Valve 118 is open and admits the remaining air to line B. Valves 120 and 121 are closed. Air in line A is heated to 1530° F., say, by heat exchange against flue gases in heat-exchanger 107. Air in lines A and B is admitted to an oxygen-absorption-desorption system such as the one already described in connection with FIGURE 1.

Carbon dioxide is absorbed from air by bed 114, which preferably is large enough to treat the quantity of air which will be processed over a good many hours. When a large part of the CaO in bed 114 has been converted to $CaCO_3$, valves 109, 120, and 121 are opened, placing bed 115 into service, and valves 108, 118, and 119 are closed. Vessel 112 is depressured to the atmosphere (through a small connection not shown in FIGURE 2), and blind flanges 110 and 116 are opened to the atmosphere. A portable furnace (not shown in FIGURE 2) is attached to flange 110, and is fired to supply flue gases at about 1800° F., say, to heat bed 114 and to decompose $CaCO_3$ in the bed. Gases are exhausted to the atmosphere through flange 116. The partial pressure of water vapor in the flue gases must not exceed the equilibrium decomposition pressure of $Ca(OH)_2$ at about 800° F., say. After bed 114 has reached substantially 1800° F., say, the portable furnace is shut down and withdrawn, and flange 110 is closed. Valve 108 is cracked open so that air flows at a small rate through bed 114 and to the atmosphere through flange 116. This flow is maintained until flue gases are thoroughly purged from bed 114. Then flange 116 is closed, and the pressure in bed 114 is raised to that of the air supply. Valve 119 is opened so that a small flow of air passes through bed 114 and into line A. Air passing through bed 114 cools the bed to about 800° F., whereupon bed 114 is again ready to treat the total flow of air. Regeneration of solid in bed 115 is accomplished in a manner analogous to that described above, with use of blind flanges 111 and 117.

In general, air will be found to contain CO, hydrocarbons, and organic vapors in amounts which add up to a total of carbon requiring removal in order to prevent formation of $BaCO_3$. This carbon can advantageously be removed as $CO_2$ by bed 114 or 115, which advantageously contains a contact agent promoting the combustion of the foregoing carbon-containing materials. It will often turn out that the natural dolomite used in preparing beds 114 and 115 contains iron in an amount sufficient to serve as the contact agent. If this is not the case, a small amount of iron oxide or nickel oxide may be added to the dolomite.

Air-depleted-in-oxygen in line C from the oxygen-absorption-desorption system is at 1500° F. and 441 p.s.i.a., say, and is expanded to 80.5 p.s.i.a., say, in power-developing expansion turbine 94. Effluent from turbine 94 is combined with hot flue gases from combustion-chamber 104 and with flue gases from heat-exchanger 106, to form a combined stream having a temperature of 1380° F., say, at 80 p.s.i.a., say. The combined stream is expanded to atmospheric pressure in power-developing expansion turbine 97 and is discharged to a stack via line 100. Alternativeily, expansion turbine 97 may discharge gases at a pressure a little above atmospheric, and heat in the gases may be recovered: either by heat exchange to water or another fluid in optional waste-heat-recovery apparatus 99; or by heat exchange to compressed gases in one or more of lines 83, 86, and 93 by use of heat-exchangers not shown in FIGURE 2; or by supplying heat to a system providing refrigerant to cooler 89, e.g., an absorption refrigeration system or a steam jet vacuum cooling system, neither of which is shown in FIGURE 2.

Air is supplied via line 96 at atmospheric pressure, and is compressed together with oxygen in compressor 97 to 49.7 p.s.i.a., say. Purge air and oxygen in line D from the oxygen-absorption-desorption system is combined with the discharge from compressor 97 to constitute an oxygen-enriched air, delivered via line 126 to an iron-making blast furnace. Flow-regulating valve 124 controls the rate of flow in line D. Oxygen from line E and oxygen and desorption air in line F are combined, are cooled by heat exchange against high-pressure air in heat-exchanger 105 and against atmospheric cooling water in cooler 125, and are committed to compressor 97. Flow-regulating valve 122 controls the flow of oxygen from line E to compressor 97. This valve is preferably used as the control on the oxygen content of oxygen-enriched air product in line 126—e.g., valve 122 can be governed to pass more oxygen with increasing flow of either purge air from line D or desorption air from line F.

A stream of high-purity oxygen may be withdrawn, if desired, from line E and discharged via line 127, the flow being controlled by flow-regulating valve 123. The high-purity oxygen may be used, for example, in one of several steelmaking processes utilizing high-purity oxygen which have come into wide use in recent years.

Compressors 82, 85, 92, and 97 and turbines 94 and 95 are linked by a shaft, so that power developed by the turbines can serve to drive the compressors. If desired, an optional electricity generator 98 may also be linked to the shaft.

I have calculated an example based upon the flowsheet illustrated in FIGURE 2 and making use of the above-outlined example of the operation of the oxygen-absorption-desorption system of FIGURE 1. The example based on FIGURE 2 supplied 135,000 standard cubic feet (60° F., 1 atmosphere) per minute (s.c.f./min.) of air enriched to 27 mole percent oxygen at a pressure of 49.7 p.s.i.a. Electricity generator 98 was not used, and no heat was recovered from gases in line 100. I used blast-furnace fuel gas supplied from the blast furnace which received the oxygen-enriched air product, the gas having the following composition:

| | Mole, percent |
|---|---|
| $CH_4$ | 0.24 |
| $H_2$ | 2.40 |
| $CO$ | 28.76 |
| $CO_2$ | 17.98 |
| $N_2$ | 49.99 |
| $A$ | 0.63 |

The higher heating value of the blast-furnace fuel gas needed by the example was 227 millions of British Thermal Units per hours (MM B.t.u./hr.).

For comparison with the foregoing example of the invention, I calculated a simple-cycle gas-turbine plant which supplied ordinary air at 49.7 p.s.i.a. to a blast furnace at a rate of 173,654 s.c.f./min. [At this rate, the air's oxygen content was the same as the oxygen content of oxygen-enriched air from the foregoing example.] The gas-turbine plant consisted simply of a blast-furnace gas compressor, a single air compressor (product air being bled from an intermediate point in the compressor), and a single flue-gas turbine. The gas-turbine plant utilized a blast-furnace fuel gas derived from an ordinary-air-blown blast furnace and having the following composition:

| | Mole, percent |
|---|---|
| $CH_4$ | 0.20 |
| $H_2$ | 2.00 |
| $CO$ | 24.00 |
| $CO_2$ | 15.00 |
| $N_2$ | 58.07 |
| $A$ | 0.73 |

The gas-turbine plant expanded flue gas at 1380° F. from 80 p.s.i.a. to 14.7 p.s.i.a., and required 241 MM B.t.u./hr. of the foregoing fuel gas to supply the 173,654 s.c.f./min. of air at 49.7 p.s.i.a. The plant had the same total brake-horsepower of machines (compressors+turbines) as the example of the invention supplying 135,000 s.c.f./min. of air enriched to 27% oxygen. The gas-turbine plant required about 28 percent greater intake of air, the intake being reckoned including the air product.

The foregoing comparisons illustrate the great economy of the new process for supplying oxygen-enriched air to the blast furnace. The fuel consumption is less than that needed to furnish the same oxygen in air by the order of 5 percent.

I have also made a rough comparison of the foregoing example supplying oxygen-enriched air with equipment comprising a combination of a conventional low-temperature air-separation plant and a simple-cycle gas-turbine plant which not only supplies air to the air-separation plant but also compresses enriched air. The fuel requirement for this combination is on the order of 25 percent more than that needed by the example based on FIGURE 2; the horsepower of machines is on the order of 20 percent more; and the quantity of air handled is on the order of 45 percent more. The outstanding merit of the new process is evident.

I have calculated a modification of the example based on FIGURE 2, the modified example supplying both 135,000 s.c.f./min. of air enriched to 27% oxygen at 49.7 p.s.i.a. and also 500 tons per day of high-purity oxygen at a varying pressure ranging from 1 to about 3.5 atmospheres. In the modification, the size of the oxygen-absorption-desorption system and the rate of flow of air thereto was increased by the factor 1.802. This had the effect of increasing the relative importance of turbine 94 and diminishing the importance of turbine 95, from standpoint of the relative amounts of power generated by the two turbines. The oxygen content of flue gas in line 100 was reduced. Surprisingly, the total air intake to the plant, through lines 84 and 96, decreased by about 1 percent. The total horsepower of machines increased about 14 percent. The heating value of fuel gas required by the modification was 249 MM B.t.u./hr., an increase of 22 MM B.t.u./hr. over the 227 MM B.t.u./hr. needed to supply only the oxygen-enriched air product. The incremental fuel amounts to only about 1,060,000 B.t.u. per ton of high-purity oxygen. When one considers that several hundred kilowatt-hours of electricity is needed to produce one ton of high-purity oxygen by the conventional low-temperature air-rectification process, one readily appreciates that a fuel consumption of only a little over 1 million B.t.u.'s per ton constitutes a striking advance over present-day practice.

If more high-purity oxygen should be desired than about 500 tons per day, yet only 135,000 s.c.f./min. of oxygen-enriched air is required, there is advantage in arranging the plant so that it produces more power, which can be taken up, for example, by incorporating electricity generator 98.

FIGURE 3 illustrates a way in which the invention may be used to supply an oxygen-rich combustion gas to a power plant which incorporates a magnetohydrodynamic (MHD) electricity generator. The embodiment of FIGURE 3 also incorporates features which ensure that effluents from the power plant are unobjectionable from standpoint of air pollution.

Equipment items 84, 85, 87, 89–91, 92–94, 98, and 108–121 in FIGURE 3 operate substantially in the manner just described for equivalent items in FIGURE 2.

Heat-recovery apparatus 131 cools compressed air in line 87 with supply of heat to steam power plant 146. Compressed air in line 93 is heated to about 800° F., say, in heat-exchanger 143 against combustion gases which have been generated in combustion-chamber 135 and have already been partially cooled in MHD electricity-generator 136 and heat-exchangers 137–142. Air from heat-exchanger 143 is treated in either vessel 112 or 113. Air in line A is heated to 1530° F., say, in heat-exchanger 142 against the MHD combustion gases; and this air, together with air in line B, is admitted to an oxygen-absorption-desorption system such as that already described in connection with FIGURE 1. Air-depleted-in-oxygen leaving this system via line C is expanded in turbine 94, is reheated in exchanger 138 against MHD combustion gases, and is finally expanded to a little above atmospheric pressure in turbine 132, which exhausts air-depleted-in-oxygen to waste-heat-recovery apparatus 99, furnishing heat to steam power plant 146.

A sulfur-bearing fuel, such as residual fuel oil or coal, is gasified in apparatus 133 by reaction with a first gas comprising primarily oxygen and carbon dioxide, supplied from the discharge of compressor 153. Raw fuel gas from apparatus 133 is treated to remove sulfur and dust in apparatus 134. Elemental sulfur is produced in apparatus 134, and may be sold as a byproduct of the power plant. Clean fuel gas from apparatus 134 is heated against MHD combustion gases in heat-exchanger 140, and is burned in combustion-chamber 135 together with a second gas comprising primarily oxygen and carbon dioxide, supplied from heat-exchanger 141. Chamber 135 operates at about 5 atmospheres, say. The relative amounts of fuel gas, oxygen, and carbon dioxide to chamber 135, as well as the temperature of the gases from heat-exchangers 140 and 141, are regulated so that the temperature of combustion gases emerging from chamber 135 is on the order of 4300° F., say. A "seed" salt is added to chamber 135 so that gases leaving the chamber are electrically conducting. A cesium salt is generally preferred, although a potassium salt may be used. The electrically-conducting combustion gases are led through MHD electricity-generator 136, a duct having the general form of a venturi and fitted with auxiliaries (not shown in FIGURE 3) which convert energy in the expanding combustion gases into direct-current electricity. Gases leave the MHD generator at a little above atmospheric pressure and at a temperature on the order of 3600° F., say. The gases are cooled by passing them through duct 145, which houses heat-exchangers 137–144. Heat-exchangers 137, 139, and 144 are supplied with water or steam from power plant 146, and return heated water, steam, or superheated steam to plant 146. A portion of the MHD gases is withdrawn via line 147 and compressed to about 5 atmospheres, say, in compressor 152. A second portion of the MHD gases, regulated to maintain substantially constant pressure within duct 145, is committed to apparatus 148, where seed is recovered from the gases. Most of the seed-free gases from apparatus 148 are sent via line 149 to join air-depleted-in-oxygen from apparatus 99 in line 100, which carries the combined gases to a stack. A small part of the seed-free gases are withdrawn from line 149 via line 150.

High-purity oxygen from line E is partly sent via flow-regulating valve 123 to heat-recovery apparatus 154, which furnishes heat to plant 146. Oxygen from apparatus 154 joins recycled combustion gases from line 150, and the combined gases are compressed in compressor 153 to a pressure sufficiently higher than the pressure in combustion-chamber 135 to overcome the combined pressure drop through apparatuses 133 and 134 and heat-exchanger 140. The remaining high-purity oxygen from line E is sent via flow-regulating valve 122 to join oxygen and desorption air in line F, and the combined stream is cooled in heat-recovery apparatus 155, which furnishes heat to plant 146. The stream from apparatus 155 is compressed together with recycled combustion gases in compressor 152 to about 5 atmospheres. Purge air and oxygen from line D is sent via flow-regulating valve 124 to join gases from the discharge of compressor 152, and the combined stream is heated in heat-exchanger 141 against MHD combustion gases. Compressors 152 and 153 are powered by a suitable driver 151.

Flow-regulating valve 122 is governed to maintain a substantially constant flow of oxygen in gases to heat-exchanger 141—i.e., the valve passes more oxygen with an increase in flow of either desorption air in line F or purge air in line D. If oxygen-rich air is preferred to relatively pure oxygen, air may be introduced into the suction of compressor 152. On the other hand, if substantially complete elimination of nitrogen from MHD combustion gases should be desired, this may be accomplished as follows: The use of desorption air should preferably be limited to the fluidization step, and gases from an oxygen-absorption-desorption vessel should be vented to the atmosphere during this step. A vacuum blower should preferably be used to promote the desorption of oxygen at sub-atmospheric pressures. Purge air should preferably be vented from line D to the inlet of expansion turbine 132, and the flow of gas from line D to heat-exchanger 141 should commence when the oxygen content of the gas rises to a suitable level.

Seed compound is in form of a vapor in MHD generator 136, but condenses to a fume as the MHD combustion gases are cooled. Some of the fume may settle out in duct 145, and such fume should be recovered from time to time. A large portion of the fume present in the recycled gases in line 147 will simply pass without settling through compressor 152 and heat-exchanger 141, and hence will be returned to combustion-chamber 135.

Steam power plant 146 may advantageously be of the top heat variety—i.e., the temperature of steam is raised by direct addition of products of combustion of a clean fluid fuel with oxygen or air, and steam is condensed against a bottoming-fluid, such as ammonia, which serves as cycle fluid in a Rankine cycle rejecting heat to atmospheric cooling water. If this top heat principle is used, there is advantage in subjecting raw fuel to the power plant to a cracking, hydrocracking, carbonization, hydrocarbonization, or hydrogasification step which has the characteristic of splitting the fuel into a hydrogen-rich fraction and a coke which is lean in hydrogen. The coke is advantageously used in step 133, while the hydrogen-rich fraction can be subjected to steps which yield a clean fluid fuel for use in the top heat steam power plant. The performance of an MHD electricity generator is greatly improved if little or no steam is present in the combustion gases which flow through the MHD duct. If a hydrogen-lean coke is used in step 133, the steam content of the combustion gases will be minimal.

An outstanding advantage of the arrangement illustrated in FIGURE 3 is that no system is required to recover sulfur and nitrogen oxides from MHD combustion gases before the gases are discharged to the atmosphere.

If electricity is to be generated from a clean fluid fuel which is already available, such as natural gas or a distillate oil, the process of FIGURE 3 may be modified by omitting items 123, 133, 134, 150, 153, and 154.

I do not wish my invention to be limited to the particular embodiments of the accompanying figures. Those skilled in the art will recognize other arrangements and other applications of the invention which will differ from my examples only in detail, not in spirit. Only such limitations should be imposed as are indicated in the appended claims.

I claim:
1. A process useful in the production of oxygen and power, comprising:
   compressing air to an elevated pressure;
   adding heat to said compressed air;
   passing said heated air into a bed composed of a solid capable of absorbing oxygen exothermically, thereby conducting an oxygen-absorption step in said bed and progressively raising the temperature of at least part of said bed;
   withdrawing air-depleted-in-oxygen from said bed and expanding said air-depleted-in-oxygen through a power-developing expansion turbine;
   terminating said oxygen-absorption step by interrupting the flow of said air to said bed;
   conducting an oxygen-desorption step while supplying substantially no heat to said bed by indirect exchange of heat from hot combustion gases by reducing the pressure in said bed thereby causing oxygen to desorb therefrom endothermically thereby lowering the temperature of at least part of said bed;
   conducting said oxygen-absorption step and said oxygen-desorption step repeatedly in said bed;
   and mixing the solid in said bed periodically thereby displacing solid from the air-inlet end of said bed into the interior of said bed.

2. The process of claim 1 in which a system of at least two beds is employed so that an oxygen-absorption step is in progress somewhere in the system at substantially all times.

3. The process of claim 1 in which also said mixing of said solid is accomplished by fluidizing said bed.

4. The process of claim 3 in which also air is supplied to the bottom of said bed in the last moments of an oxygen-desorption step in said bed at a rate to cause said bed to become fluidized.

5. The process of claim 1 including the following additional steps:
   causing said oxygen desorbed from said bed to flow over a heat-storage solid;
   and in a subsequent oxygen-absorption step conducted in said bed adding a part of said heat to said compressed air by passing a minor portion of said air over said heat-storage solid before passing said minor portion into said bed.

6. The process of claim 1 in which also said elevated pressure is at least about 60 p.s.i.a.

7. The process of claim 1 in which also at least a portion of oxygen is desorbed from said bed at progressively lower sub-atmospheric partial pressures through the agency of a flow of air into and through said bed.

8. The process of claim 7 including: combining oxygen desorbed in said manner with air to yield oxygen-enriched air.

9. The process of claim 8 including the following additional steps:
adding at least a part of said heat to said compressed air by indirect exchange of heat from products of combustion of blast-furnace fuel gas at an elevated pressure;
and furnishing oxygen-enriched air to a blast furnace.

10. The process of claim 9 including: supplying oxygen in a state of high purity to a steelmaking process.

11. The process of claim 1 including the following additional steps:
adding at least a part of said heat to said compressed air by indirect exchange of heat from combustion gases from a magnetohydrodynamic electricity generator;
and deriving said combustion gases from a combustion to which is supplied a clean fluid fuel, a gas containing oxygen arising at least in part from said desorbed oxygen, and recycled combustion gases.

12. The process of claim 11 including the step of deriving said clean fluid fuel from a sulfur-bearing fuel by processes which include gasifying said sulfur-bearing fuel with a gasification medium containing a part of said desorbed oxygen.

13. The process of claim 1 in which also the active ingredient of said solid absorbent is barium oxide and including the step of removing carbon dioxide from said compressed air.

14. The process of claim 13 in which also said step removing carbon dioxide comprises contacting said air with calcined dolomite.

15. The process of claim 13 in which also said solid absorbent comprises an intimate intermingling of tiny crystallites of barium and magnesium oxides.

16. A process useful in the production of oxygen or power, comprising:
compressing air to a pressure greater than about 60 p.s.i.a.;
adding heat to said compressed air;
passing said air over an oxygen-absorbing solid;
expanding air-depleted-in-oxygen from said solid through a power-developing expansion turbine;
and removing air from said solid and reducing the pressure over said solid thereby causing oxygen to desorb therefrom while supplying substantially no heat to said solid from hot combustion gases.

17. The process of claim 16 in which the active ingredient of said oxygen-absorbing solid is barium oxide.

18. The process of claim 16 in which said solid is fluidized during at least a portion of the time during which said oxygen is desorbing therefrom.

19. Apparatus useful in the production of oxygen or power, comprising:
a vessel suitable to contain high-pressure, high-temperature gases;
a bed situated within said vessel of a solid absorbent having the power to absorb oxygen from air at high temperature;
plenum spaces above and below said bed:
a first valved connection from a first of said plenum spaces to a header supplying air at elevated pressure and elevated temperature;
a second valved connection from the second of said plenum spaces to a header to receive air-depleted-in-oxygen;
a power-developing expansion turbine;
means for supplying air-depleted-in-oxygen to said turbine;
a bed of a heat-storage solid and in communication at one end with said first plenum space and in communication at the other end via a third valved connection to a header supplying air at elevated pressure and via a fourth valved connection to a header to receive oxygen, said bed of heat-storage solid being situated within an extension of said vessel;
means to close said fourth valved connection and to open said first, second, and third valved connections, thereby causing air to enter said first plenum from said bed of heat-storage solid and also from said header supplying air at elevated pressure and elevated temperature and causing air-depleted-in-oxygen to pass from said second plenum to said header to receive air-depleted-in-oxygen;
means thereafter to close said first, second, and third valved connections, and to open said fourth valved connection;
and means to control the pressure level in said header to receive oxygen causing oxygen to desorb from said bed of solid absorbent at a controlled rate and to pass from said bed through said first plenum and said bed of heat-storage solid into said header to receive oxygen.

20. Apparatus of claim 19 in which also the active ingredient of said solid absorbent is barium oxide.

21. Apparatus useful for the production of oxygen and power, comprising:
a bed composed of a solid material capable of absorbing oxygen exothermically;
means for compressing air to an elevated pressure;
means for adding heat to said compressed air;
means for passing said heated air to said bed whereby oxygen is absorbed and the temperature of said bed is progressively raised from lower to higher level;
means for withdrawing air-depleted-in-oxygen from said bed;
a power-developing expansion turbine;
means for supplying air-depleted-in-oxygen to said turbine;
means for terminating the flow of said heated air to said bed;
means for producing oxygen from said bed while supplying substantially no heat to said bed by indirect exchange of heat from hot combustion gases by reducing the pressure thereby causing oxygen to desorb therefrom endothermically thereby lowering the temperature in said bed;
and means for periodically mixing the solid in said bed thereby displacing solid from the air-inlet end of said bed into the interior of said bed.

22. Apparatus of claim 21 including:
at least one additional bed composed of said solid;
means for passing said heated air to said additional bed, means for withdrawing air-depleted-in-oxygen from said additional bed, means for terminating the flow of said heated air to said additional bed, means for producing oxygen from said additional bed by reducing the pressure, and means for periodically mixing the solid in said additional bed;
and means for regulating the operation of the given beds in a manner such that air is passed to at least one of said given beds at nearly all times.

23. Apparatus of claim 21 in which the active ingredient of said solid is barium oxide.

References Cited

UNITED STATES PATENTS 3,276,203   10/1966   Squires _____ 60—39.05

MARK NEWMAN, *Primary Examiner.*

R. D. BLAKESLEE, *Assistant Examiner.*